(12) United States Patent
Zhou

(10) Patent No.: US 7,436,328 B2
(45) Date of Patent: Oct. 14, 2008

(54) VIDEO CODING WITH START CODE EMULATION PREVENTION

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 259 days.

(21) Appl. No.: 10/888,702

(22) Filed: Jul. 9, 2004

(65) Prior Publication Data

US 2005/0007263 A1    Jan. 13, 2005

Related U.S. Application Data

(60) Provisional application No. 60/485,923, filed on Jul. 9, 2003.

(51) Int. Cl.
*H03M 7/00* (2006.01)
(52) U.S. Cl. .......................... 341/50; 341/51
(58) Field of Classification Search .................... 341/50, 341/1, 51; 706/48
See application file for complete search history.

(56) References Cited

OTHER PUBLICATIONS

Sullivan, U.S. Appl. No. 10/418,735, Methods and SYstems for preventing start code emulation at locations that include non-byte aligned and/or bit-shifted positions, filed Apr. 18, 2003.*
Sullivan et al. (U.S. Appl No. 10/350,273), Methods and systems for start code emulation prevention and data stuffing, filed on Jan. 22, 2003.*

* cited by examiner

*Primary Examiner*—Jean B Jeanglaude
(74) *Attorney, Agent, or Firm*—Mirna Abyad; Wade J. Brady, III; Frederick J. Telecky, Jr.

(57) ABSTRACT

A low-complexity method for prevention of H.264 start code emulation by bit-handling routines with additional functionality. The low-complexity is achieved by employing a start code pre-determination scheme, which saves bitstream handling complexity by about 50% and 30% on the encoder and decoder sides, respectively. The start code emulation prevention has been embedded into the low-level bitstream handling routines. By doing so it avoids the use of the second bitstream buffer, maintains the decoder ability of using a circular bitstream buffer, and satisfies the BURST-aligned SDRAM access requirement.

9 Claims, 3 Drawing Sheets

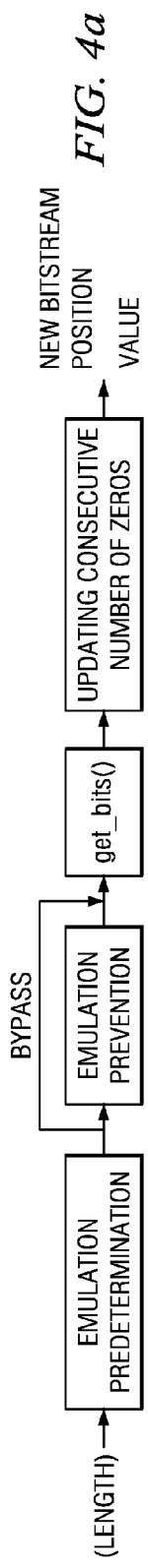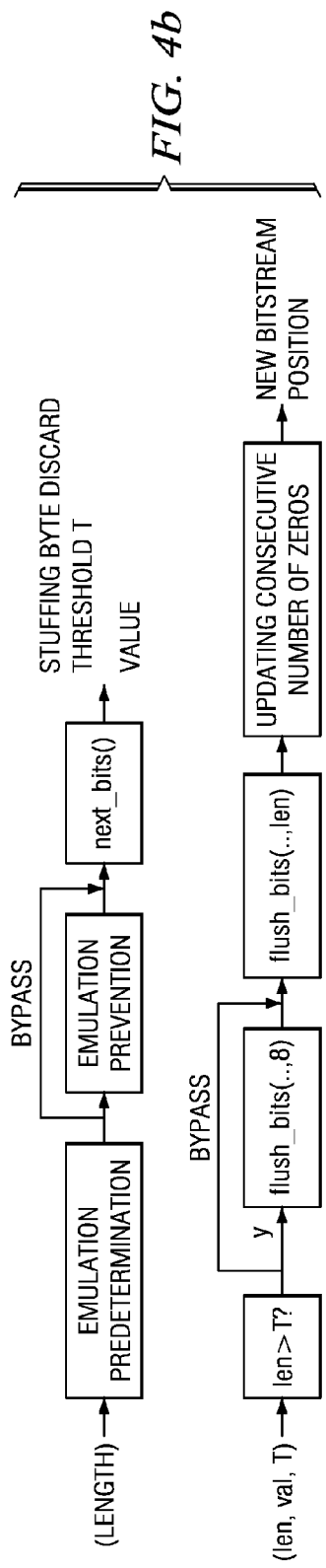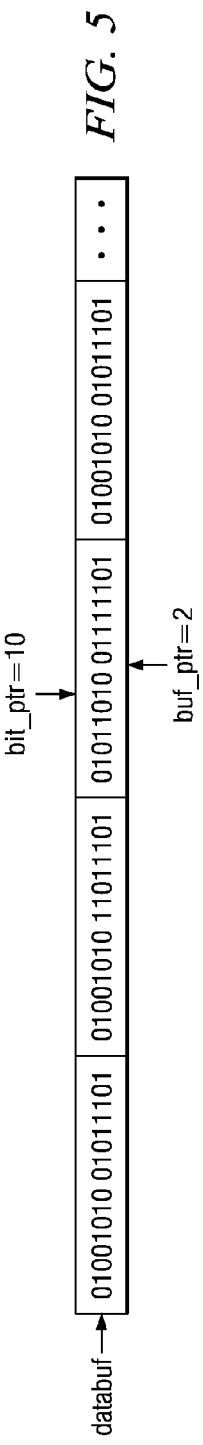

VIDEO CODING WITH START CODE EMULATION PREVENTION

CROSS-REFERENCE TO RELATED APPLICATIONS

This application claims priority from provisional application No. 60/485,923, filed Jul. 9, 2003.

BACKGROUND OF THE INVENTION

The present invention relates to video coding, and more particularly to H.264 and related coding methods.

Currently, H.264 is the most advanced video compression standard and is being jointly developed by MPEG and ITU-T. It offers much higher coding efficiency compared to the existing video standards such as MPEG1, MPEG2, and MPEG4. It is widely expected that H.264 will be adopted in applications such as video conferencing, streaming video, HD-DVD, and digital video broadcasting.

In H.264 the video element bitstream is defined in the form of network abstraction layer (NAL) units. A NAL unit is a syntax structure containing an indication of the type of data to follow and bytes containing that data in the form of a raw byte stream payload (RBSP) interspersed as necessary with emulation prevention bytes. It could be a sequence header, a picture header, and a slice with header and data. In the byte stream format described in Annex B of H.264, the start code is defined as byte-aligned 0x000001 (i.e. twenty-three 0 bits followed by a single 1 bit). The byte stream format consists of a sequence of byte stream NAL unit syntax structures. Each byte stream NAL unit syntax structure contains one three-byte start code prefix (0x000001) followed by one nal_unit (NumBytesInNALunit) syntax structure. Indeed, H.264 Annex B decoding the byte stream to yield NAL units has the following steps:
1. find the next 0 byte plus three-byte start code (0x000001), and discard the 0 byte.
2. discard the three-byte start code.
3. NumBytesInNALunit is set equal to the number of bytes up to and including the last byte preceding one of: a sequence of three 0 bytes, the next start code, or the end of the byte stream.
4. NumBytesInNALunit bytes are removed from the byte stream and are decoded using the NAL unit decoding process.
5. when the next three bytes are not a start code (otherwise go to step 2) and the next four bytes are not a 0 byte plus a start code (otherwise go to step 1), repeatedly discard a 0 byte until a 0 byte plus a start code are found and then go to step 1.

The NAL unit is then decoded.

In order to avoid emulation of the three-byte start code within the NAL unit, certain rules are defined. First of all, the last byte of a NAL unit shall not be equal to 0x00. Secondly, within a NAL unit, the following three-byte sequences shall not occur at any byte-aligned position:
0x000000
0x000001
0x000002

Finally, within a NAL unit, any four-byte sequence that starts with the three bytes 0x000003 other than the following sequences shall not occur at any byte-aligned position:
0x00000300
0x00000301
0x00000302
0x00000303

An encoder can produce a NAL unit from RBSP data (RBSP data is the raw bitstream data of an NAL unit before undergoing the following procedure) by the following procedure.

The RBSP data is searched for byte-aligned bits of the following binary patterns:
'00000000 00000000 000000xx' (where xx represents any 2 bit pattern: 00, 01, 10, or 11), and a byte equal to 0x03 is inserted between the second and third bytes to replace these bit patterns with the bit patterns
'00000000 00000000 00000011 000000xx', and finally, when the last byte of the RBSP data is equal to 0x00, a final byte equal to 0x03 is appended to the end of the data.

During decoding, a decoder should recognize the stuff byte 0x03 and discard it from the bitstream.

A simple method to prevent start code emulation would be to have two on-chip bitstream buffers. As shown in FIG. 1, on the encoder side, the encoder puts all of the RBSP data (of a NAL unit) into the first bitstream buffer. After encoding the NAL unit, the encoder parses through the RBSP bitstream data byte by byte, inserts stuff bytes 0x03 as needed to form the NAL unit data, and stores the NAL unit data in the second bitstream buffer. The bitstream is finally written to off-chip memory, e.g., SDRAM. On the decoder side, the NAL unit data is loaded into the second bitstream buffer from the SDRAM. The decoder then parses through the NAL unit data byte by byte to produce RBSP data by eliminating stuff bytes 0x03 from the NAL unit data. The RBSP data is stored in the first bitstream buffer for decoding.

However, the two-buffer method leads to problems for H.264 implementation on 16-bit devices, such as the DM270 manufactured by Texas Instruments, especially on the decoder side. The DM270 has a C54-based DSP subsystem; and a C54 supports either 16-bit or 32-bit memory access but not 8-bit memory access. The SDRAM off-chip memory on a DM270 requires data be accessed at BURST boundary (1 BURST=32 bytes in this particular case). Moreover, a circular decoder bitstream buffer is used to avoid the bitstream shifting and satisfy BURST aligned SDRAM access requirements.

On the decoder side, eliminating the stuff byte "0x03" from the bitstream results in a decrease of the active bitstream size. This creates problems for bitstream handling because of circular bitstream buffer usage, BURST aligned SDRAM access requirements. An example is shown in FIG. 2 to explain the problems. If the circular bitstream buffer is 512 words (1 word=16-bit), then the DSP first loads in 512 words from the SDRAM to the second bitstream buffer, parses through it, finds and eliminates, for example, one stuffing byte from the incoming stream, then copies the resulting bitstream to the circular buffer (first buffer). In this particular example, the circular buffer has only 511.5 active words due to the deleted stuffing byte. However, the active circular buffer size has to be a multiple of 16 bits (because a 16-bit DSP cannot access memory in bytes). Otherwise, the circular buffer won't work. In order to be able to operate the bitstream buffer in a circular manner, the decoder has to load one more byte from the SDRAM to fill up the bitstream buffer. However, this leads to the next SDRAM access start address off the BURST-aligned boundary. The decoder has the choice to not load the additional byte so as to keep the next SDRAM access start address BURST-aligned, but this will disable the bitstream buffer to work in a circular manner and greatly decrease the decoder performance. Indeed, any odd number of stuffing bytes in the given size of bitstream will lead to these problems. Note that the start code plus the nal_unit_type byte take up four bytes.

On the encoder side, the problem is not as serious as on the decoder side. After the emulation prevention on the RBSP data of an NAL unit, the encoder writes out NAL unit data (in the second buffer) to SDRAM in the size of multiples of BURST. After writing out data, there is residual data left in the second buffer (size less then BURST length). The encoder copies the residual NAL unit data back to the first bitstream buffer and starts encoding of the next NAL unit. During the emulation prevention process, the encoder should skip Oust make direct copy from the first buffer to the second buffer) the residual data of the previous NAL unit, and start the emulation prevention at the beginning of the RBSP data of the current NAL unit.

SUMMARY OF THE INVENTION

The present invention provides an emulation prevention method that integrates stuff byte avoidance into bit handling routines.

This has advantages including use with word-aligned processes for word lengths greater than one byte.

BRIEF DESCRIPTION OF THE DRAWINGS

The drawings are heuristic for clarity.

FIG. 4 shows preferred embodiment bit handling functions.

FIG. 5 shows position in a bitstream.

DESCRIPTION OF THE PREFERRED EMBODIMENTS

1. Overview

The preferred embodiment methods of prevention of start code emulation incorporate the emulation prevention into bitstream handling routines for both the encoder and decoder.

The bitstream handling routines refer to the following four functions:

| | |
|---|---|
| put_bits(buf_ptr, bit_ptr, databuf, length, codeword) | append "length"-bit "codeword" to the bitstream, and update the bitstream position by "length" bits. |
| get_bits(buf_ptr, bit_ptr, databuf, length) | extract the value (as binary integer) of "length" bits from the bitstream, and update the bitstream position by "length" bits. |
| next_bits(buf_ptr, bit_ptr, databuf, length) | extract the value of "length" bits from the bitstream without updating the bitstream position. |
| flush_bits(buf_ptr, bit_ptr, databuf, length) | move the bitstream position by "length" bits | where (buf_ptr, bit_ptr) is the bitstream position (see FIG. 5), and databuf is the bitstream buffer.

Figure 1:
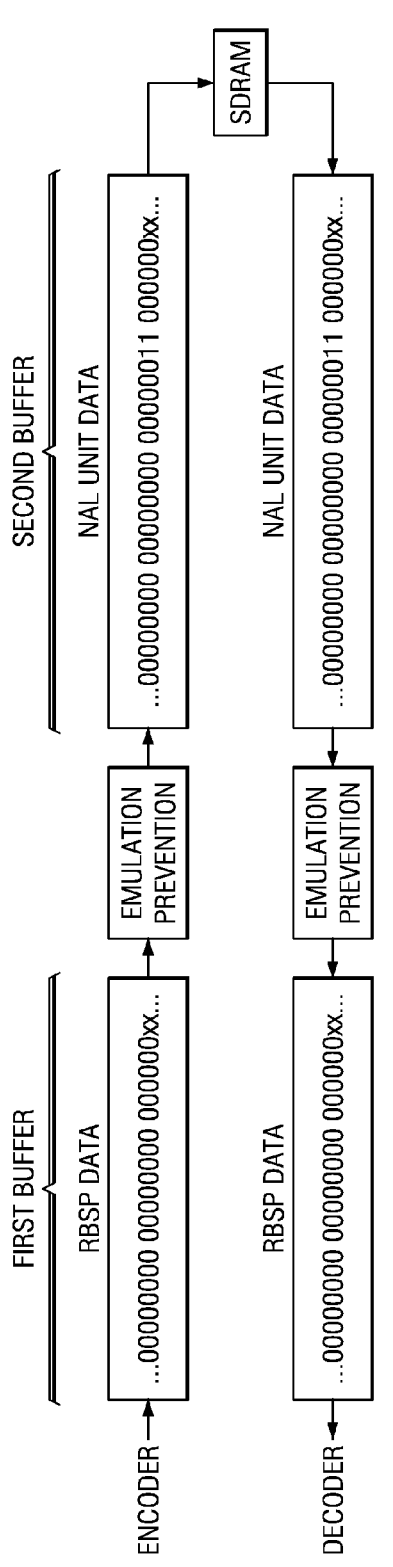
FIG. 1 shows emulation prevention encoding and encoding using two buffers.
Figure 2:
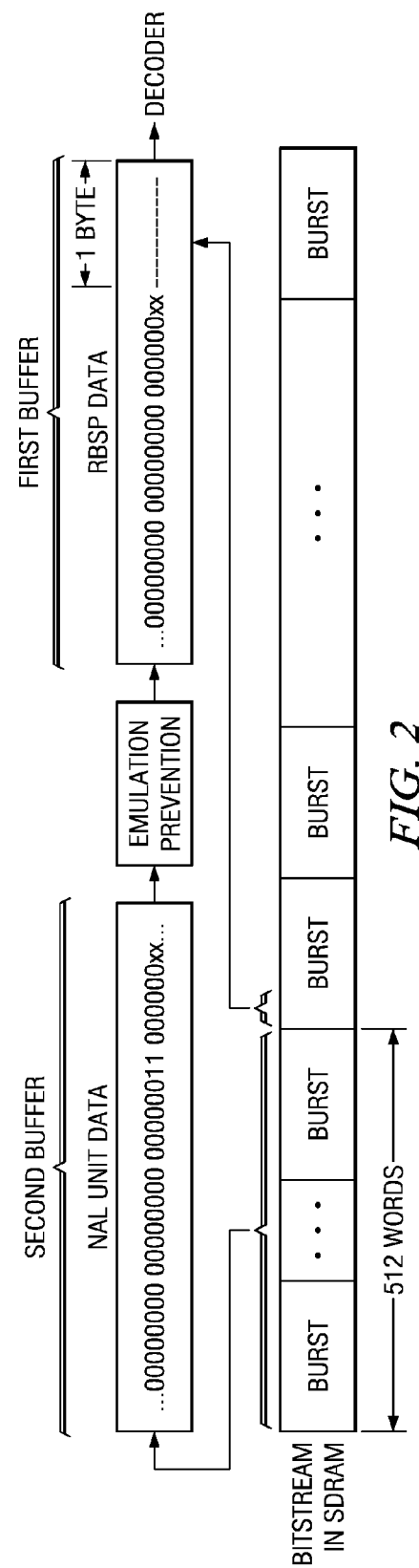
FIG. 2 illustrates problems for 16-bit processing.
Figure 3:
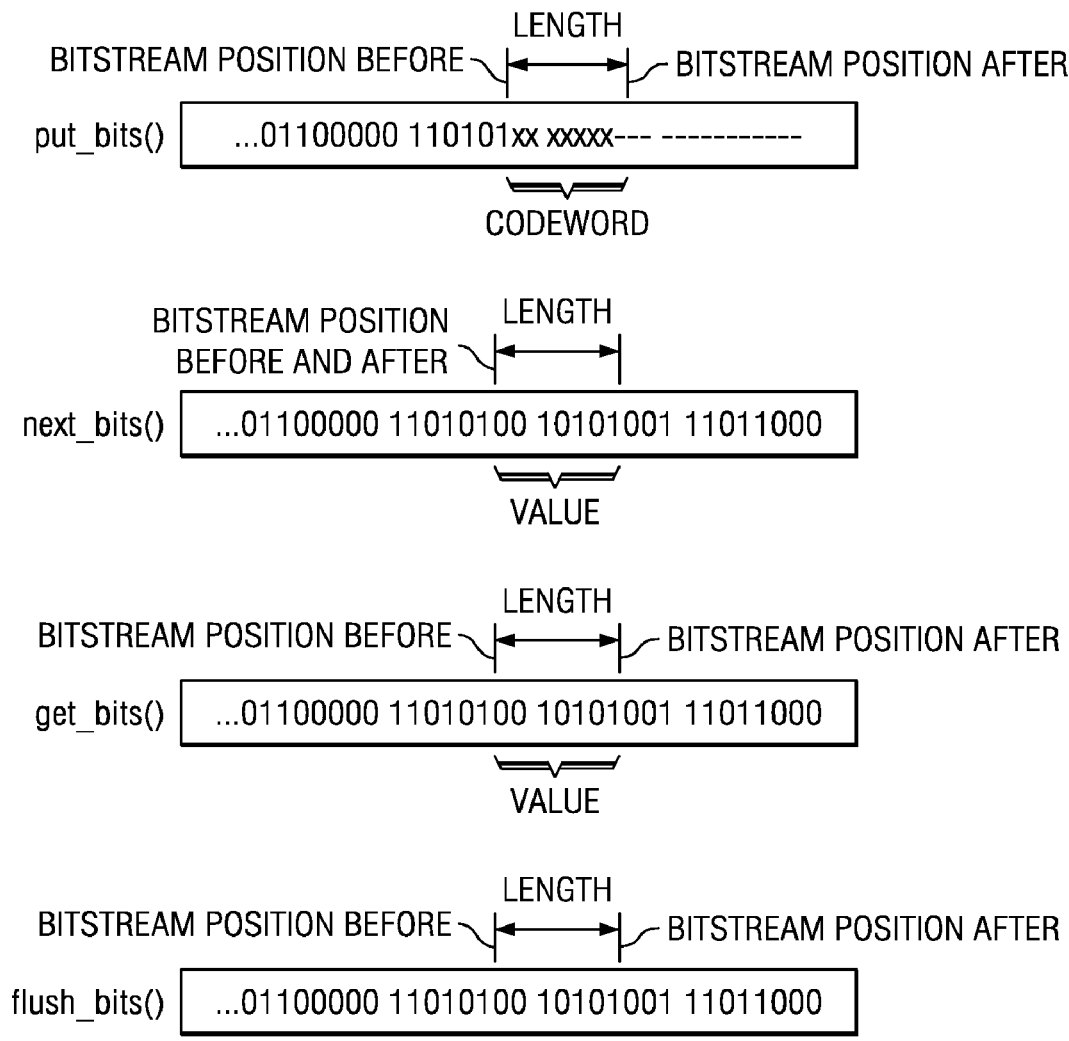
FIG. 3 demonstrates bit handling functions.

The function put_bits( ) is used by the encoder, whereas get_bits( ), next_bits( ), and flush_bits( ) are used by the decoder. For 16-bit devices, "length" is in the range of [1:16], inclusive. FIG. 3 illustrates these bitstream handling routines.

FIG. 4 illustrates the preferred embodiment low-complexity emulation prevention method embedded into the bitstream handling routines, where the functions get_bits( ), next_bits( ), flush_bits( ) and put_bits( ) are exactly same as those depicted in FIG. 3. Denote the corresponding functions after integration of the emulation prevention as get_bits_ep( ), next_bits_ep( ), flush_bits_ep( ) and put_bits_ep( ). The preferred embodiment method includes three parts, namely:

1. a low-complexity pre-determination scheme for the start code emulation prevention, which is based on estimated number of consecutive zeros at the current position in the bitstream. This scheme greatly reduces the overall complexity by cutting the number of invocations of the emulation prevention scheme.

2. a start code emulation prevention scheme which detects the start code emulation and inserts/discards the stuffing byte on the encoder/decoder side.

3. and a scheme to append bits to the bitstream or to extract bits from the bitstream using existing routines.

2. First Preferred Embodiment

For the convenience of description, consider a 16-bit device as an example to discuss the details of the proferred embodiment method.

Define the bitstream data structure for 16-bit devices as:

short buf_ptr;/*points to the index of the current 16-bit word*/ short bit_ptr;/*points to the next available bit position in the current 16-bit word, value in the range 1-16*/ unsigned short*databuf;/*bitstream buffer in units of 16 bits*/ where (buf_ptr, bit_ptr) is the bitstream position. An example with bitstream position of (buf_ptr=2, bit_ptr=10) is shown in FIG. 5, in which bits that are already parsed through are to the left; note that the parsing order within a word is from bit 16 (MSB) to bit 1 (LSB) so the bitstream position at a word boundary is bit 16.

Let buf_ptr be the index of the current 16-bit word in the bitstream buffer, and define index buf_ptr_m1, buf_ptr_m2, buf_ptr_p1, buf_ptr_p2 as increments:

If the bitstream buffer is a linear buffer buf_ptr_m1=buf_ptr−1;

buf_ptr_m2=buf_ptr−2;

buf_ptr_p1=buf_ptr+1;

buf_ptr_p2=buf_ptr+2;

If the bitstream buffer is a circular buffer and if BUFSIZE1 is the circular buffer size minus 1 (in 16-bit units), buf_ptr_m1=(buf_ptr+BUFSIZE1)&BUFSIZE1;

buf_ptr_m2=(buf_ptr+BUFSIZE1−1)&BUFSIZE1;

buf_ptr_p1=(buf_ptr+1) &BUFSIZE1;

buf_ptr_p2=(buf_ptr+2) &BUFSIZE1;

The four preferred embodiment emulation prevention functions are described in the following four subsections.

(1) get_bits_ep( )—emulation prevention with get_bits( ):

The function get_bits (buf_ptr, bit_ptr, databuf, length) is to extract the value (i.e., interpret as a binary integer) of the sequence of bits of "length" from the bitstream starting at the position defined by buf_ptr, bit_ptr and also move the bitstream position pointer by "length". With the emulation prevention integrated, get_bits_ep( ) should be able to detect the stuffing byte and discard it during the decoding.

The following four steps are involved in get_bits_ep (buf_vptr, bit_ptr, databuf, length) (see (a) in FIG. 4):

---

1. emulation pre-determination:
     if (num_zeros + length >= 17) possible_emulation = true; else possible_emulation = false; where num_zeros stands for the estimated number of consecutive zeros in the bitstream, it is set to zero at the beginning of each NAL unit.
2. emulation prevention: this step is performed only if possible_emulation = true; Otherwise, this step is bypassed. There are three cases in this step
    a. if (bit_ptr ==16) { /* current bitstream position at 16-bit boundary */
            next24 = next_bits (buf_ptr_m1, 16 , databuf, 24);
            if (next24 ==0x03) bit_ptr = 8; /*skip stuff byte */
            if (next24 != 0x03 && length > 8) {
                    next24 = next_bits (buf_ptr_m1, 8, databuf, 24);
                    if (next24 ==0x03) { buf_ptr = buf_ptr_p1; length = length − 8; }
            }
       }
    b. else if (bit_ptr >= 8 && length>bit_ptr−8) { /*current bitstream position at higher byte */
            next24 = next_bits (buf_ptr_m1, 8 , databuf, 24);
            if (next24 ==0x03) {
                    buf_ptr = buf_ptr_p1; length = length − (bit_ptr−8); bit_ptr=16;
            }
            if (next24 != 0x03 && length>bit_ptr) {
                    next24 = next_bits (buf_ptr, 16, databuf, 24);
                    if (next24 ==0x03) {
                            buf_ptr = buf_ptr_p1;
                            length = length − bit_ptr; bit_ptr =8;
                    }
            }
       }
    c. else if (bit_ptr<8 && length > bit_ptr) { /* current bitstream position at lower byte */
            next24 = next_bits (buf_ptr, 16 , databuf, 24);
            if (next24 ==0x03) { buf_ptr = buf_ptr_p1; length = length − bit_ptr; bit_ptr=8; }
            if (next24 != 0x03 && length>bit_ptr + 8) {
                    next24 = next_bits (buf_ptr, 8, databuf, 24);
                    if (next24 ==0x03)
                            { buf_ptr = (buf_ptr_p2; length = length − bit_ptr −8; bit_ptr=16; }
            }
       }
3. extract value of length bits from bitstream: value = get_bits(buf_ptr, bit_ptr, databuf, length). Note that bitstream position (buf_ptr, bit_ptr) and "length" used in this step may have been updated by step 2 if it was invoked, and so (buf_ptr, bit_ptr) could differ from the input values.
4. updating consecutive number of zeros:
            if (value = = 0) num_zeros +=length; else num_zeros = length −1;

---

3. extract value of length bits from bitstream: value =get_bits (buf_ptr, bit_ptr, databuf, length). Note that bitstream position (buf_ptf, bit_ptr) and "length" used in this step may have been updated by step 2 if it was invoked, and so (buf_ptr, bit_ptr) could differ from the input values.

4. updating consecutive number of zeros:
   if (value ==0) num_zeros +=length; else num_zeros +length −1;

Note that the update of num_zeros is conservative: the maximum number of zeros for a group of bits with value nonzero is length minus 1.

(2)-(3) next_bits_ep( ) and flush_bits_ep( )—emulation prevention with next _and flush_bits:

The function next_bits (buf_ptr, bit_ptr, databuf, length) is to extract the value of the sequence of bits of "length" from the bitstream without updating the bitstream position; flush_bits (buf_ptr, bit_ptr, databuf, length) is to update the bitstream position. With the emulation prevention integrated, next_bits_ep( ) should be able to detect the stuffing byte and discard it as needed, flush_bits_ep( ) should be able to "jump over" the stuffing byte during updating the bitstream position. The function next_bits_ep( ) looks forward length−bit value, flush_bits_ep( ) updates the bitstream position by len-bit (len<=length). The functions next_bit_ep( ) and flush_bit_ep( ) should work as a pair.

The following three steps are involved in next_bits_ep(buf_ptr, bit_ptr, databuf, length). (see (b) FIG. 4). Note that the emulation pre-determination step and emulation prevention step in next_bits ep( ) are exactly same as those defined in get_bits_ep( ), except that an additional Threshold T is returned in next_bits ep( ). T is used by flush_bit_ep( ) to determine if there is a stuffing byte to be skipped.

---

1. emulation pre-determination:
        if (num_zeros + length>=17) possible_emulation = true; else possible_emulation = false; where num_zeros stands for the number of consecutive zeros in the bitstream, it is set to zero at the beginning of each NAL unit. Set T =16;

-continued

```
2. emulation prevention: this step is performed only if possible_emulation = true;
   Otherwise, this step is bypassed. There are three cases in this step
     a. if (bit_ptr ==16) { /* current bitstream position at 16-bit boundary */
             next24 = next_bits (buf_ptr_m1, 16 , databuf, 24);
             if (next24 ==0x03) { bit_ptr = 8; T = 0; }
             if (next24 != 0x03 && length>8) {
                     next24 = next_bits (buf_ptr_m1, 8, databuf, 24);
                     if (next24 ==0x03) { buf_ptr = buf_ptr_p1; length = length – 8; T =8; }
             }
         }
     b. else if (bit_ptr>=8 && length>bit_ptr–8) { /* current bitstream position at higher byte */
             next24 = next_bits (buf_ptr_m1, 8 , databuf, 24);
             if (next24 ==0x03) {
                     buf_ptr =buf_ptr_p1;
                     length = length – (bit_ptr–8);
                     T =bit_ptr–8;
                     bit_ptr=16;
             }
             if (next24 != 0x03 && length>bit_ptr) {
                     next24 = next_bits (buf_ptr, 16, databuf, 24);
                     if (next24 ==0x03) {
                             buf_ptr=buf_ptr_p1;
                             length = length – bit_ptr;
                             T=bit_ptr;
                             bit_ptr =8;
                     }
             }
         }
     c. else if (bit_ptr<8 && length > bit_ptr) { /* current bitstream position at lower byte */
             next24 = next_bits (buf_ptr, 16 , databuf, 24);
             if (next24 ==0x03) {
                     buf_ptr = buf_ptr_p1;
                     length = length – bit_ptr;
                     T=bit_ptr;
                     bit_ptr=8;
             }
             if (next24 != 0x03 && length>bit_ptr + 8) {
                     next24 = next_bits (buf_ptr, 8, databuf, 24);
                     if (next24 ==0x03) {
                             buf_ptr = (buf_ptr_p2;
                             length = length – bit_ptr –8;
                             T=bit_ptr+8;
                             bit_ptr=16;
                     }
             }
         }
3. extract length-bit value from bitstream: value = next_bits(buf_ptr, bit_ptr, databuf, length).
   Note that bitstream position (buf_ptr, bit_ptr) and length used in this step could be
   changed in step 2 and be different from the input values.
4. updating consecutive number of zeros:
             if (value = = 0) num_zeros +=length; else num_zeros = length –1;
```

3. extract length-bit value from bitstream: valve =next_bits (buf_ptr, bit_ptr, databuf, length). Note that bitstream position (buf_ptr, bit_ptr) and length used in this step could be changed in step 2 and be different from the input values.

4. updating consecutive number of zeros:
   if (value ==0) num_zeros +=length; else num_zeros=length–1;

After next_bits_ep( ) is called, the decoder decides the number of bits to be flushed by flush_bits( ), say "len"-bit out of "length" bit needs to be flushed (len<=length), "val" is the value of "len"-bit, i.e. val=value >>(length–len), T is the threshold obtained by next_bits_ep( ).

The following three steps are involved in flush_bits_ep(buf_ptr, bit_ptr, databuf, len, T, val). No that the step of updating consecutive number of zeros is exactly same as the one defined in get_bits_ep( ).

1. "jump" over stuffing byte: if (len>T) flush_bits(buf_ptr, bit_ptr, databuf, 8);
2. update bitstream position: flush_bits(buf_ptr, bit_ptr, databuf, len);
3. updating consecutive number of zeros:
   if (val ==0) num_zeros +=len; else num_zeros=len–1;

(4) put_bits_ep( )—emulation prevention with put_bits( ):

The function put_bits(buf_ptr, bit_ptr, databuf, length, codeword) is to append "codeword" which has "length" bits to the bitstream. With integrated emulation prevention, put_bits_ep( ) should be able to detect start code emulations and insert the stuffing bytes as needed.

The following four steps are involved in put_bits_ep(buf_ptr, bit_ptr, databuf, length, codeword) (see (c) in FIG. 4):

```
1.  append "codeword" of "length" bits to bitstream and update bitstream position (but_ptr,
    bit_ptr):
        put_bits(buf_ptr, bit_ptr, databuf, length, codeword)
2.  emulation pre-determination:
        if (num_zeros + length >= 24) possible_emulation = true; else possible_emulation =
        false; where num_zeros stands for the estimated number of consecutive zeros in the
        bitstream, it is set to zero at the beginning of each NAL unit.
3.  updating consecutive number of zeros:
        if (codeword < 2) num_zeros += length; else num_zeros = length−1;
4.  emulation prevention: this step is performed only if possible_emulation = true;
    Otherwise, this step is bypassed. There are two cases in this step
    a.  if (bit_ptr <= 8) {          /* current bitstream position at lower byte */
            next24 = 0x04;
            if (length >16 − bit_ptr) {
                next24 = next_bits(buf_ptr_m2, 8, databuf, 24);
                if (next24 <0x04) {
                    databuf[buf_ptr_m1] = 0x3;
                    databuf[but_ptr_p1] =(databuf[buf_ptr]&0xff)<<8;
                    databuf[buf_ptr] = (next24<<8) + (databuf[buf_ptr]>>8);
                    bit_ptr = bit_ptr + 8;
                    buf_ptr = buf_ptr_p1;
                }
            }
            if (next24 >= 0x04 && length > 8-bit_ptr) {
                next24 = next_bits(buf_ptr_m1, 16, databuf, 24);
                if (next24 <0x04) {
                    databuf[buf_ptr_p1] = (databuf[buf_ptr]&0xff)<<8;
                    databuf[buf_ptr] = 0x0300 + next24;
                    bit_ptr = bit_ptr + 8;
                    buf_ptr = buf_ptr_p1;
                }
            }
        }
    b.  else {       /* current bitstream position at higher byte */
            next24 = 0x04;
            if (length >24 − bit_ptr) {
                next24 = next_bits(buf_ptr_m2, 16, databuf, 24);
                if (next24 <0x04) {
                    databuf[buf_ptr] = databuf[buf_ptr]>>8;
                    databuf[buf_ptr] += ((databuf[buf_ptr_m1]&0xff)<<8);
                    databuf[but_ptr_m1] =0x0300 + next24;
                    bit_ptr = bit_ptr − 8;
                }
            }
            if (next24>=0x04 && length>16-bit_ptr) {
                next24 = next_bits(buf_ptr_m2, 8, databuf, 24);
                if (next24 <0x04) {
                    databuf[buf_ptr] = (next24<<8) + (databuf[buf_ptr]>>8);
                    databuf[buf_ptr_m1] = 0x03;
                    bit_ptr = bit_ptr − 8;
                }
            }
        }
```

Thus the preferred embodiment methods extend the four bit handling functions to prevent start code emulation.

3. Complexity

The overall complexity of a preferred embodiment method comes from three parts, the pre-determination of the start code emulation, the emulation prevention, and appending/extracting bits to/from the bitstream. It should be pointed out that having the emulation pre-determination scheme in the method greatly reduces the overall complexity of bitstream handling with embedded emulation prevention.

On the decoder side, the emulation pre-determination scheme (i.e. steps 1 plus 4 in get_bits_ep( ), or step 1 in next_bits ep( ) plus step 3 in flush_bits_ep( )) costs about 17 cycles (on the TI TM320C5X DSP), the emulation prevention scheme (i.e. step 2 in get_bits_ep( ) or in next_bits_ep( )) costs about 50 cycles, and extracting bits from bitstream (i.e. step 3 in get_bits_ep( ) or step 3 in next_bit_ep( )+step 2 in flush_bits_ep( )) needs about 23 cycles. Statistics data shows that only 20% of time the emulation prevention scheme is invoked during the decoding. Therefore, the overall complexity for get_bits_ep( ) or next_bits_ep( )+flush_bits_ep( ) is about 50 cycles (i.e. 17+23+50*0.2). Without the emulation pre-determination scheme, the emulation prevention scheme would be invoked 100% of time, the overall complexity would run up to 73 cycles (23+50). Therefore, having the emulation pre-determination scheme on the decoder side leads to about 32% cycle saving.

Even greater saving is achieved on the encoder side. The emulation pre-determination scheme (i.e. step 2 plus 3 in put_bits_ep( )) costs about 17 cycles, the emulation prevention scheme (i.e. step 4 in put_bits_ep( )) costs about 60 cycles, and appending bits to bitstream (i.e. step 1 in put_bits_ep( )) needs about 23 cycles. Statistics data shows that only 5% of time the emulation prevention scheme is invoked during the encoding. Therefore, the overall complexity for put_bits_ep( ) is about 43 cycles (i.e. 17+23+60*0.05). Without the emulation pre-determination scheme, the overall complexity would run up to 83 cycles (23+60). Therefore, having the emulation pre-determination scheme on encoder side provides about 48% cycle saving.

What is claimed is:

1. A method of decoding a bitstream, comprising:
    (a) receiving a bitstream encoded as a sequence of units, each unit with a start code prefix and with at least one unit including at least one stuff byte for prevention of emulation of said start code within said unit; and
    (b) decoding said units with at least one bit-handling routine which discards said at least one stuff byte, said at least one bit-handling routine is selected from a group comprising at least one of a read bit with a shift of bit position, a read bit without a shift of bit position, or a shift bit position.

2. The method of claim 1, wherein:
    (a) said at least one bit-handling routine extracts bits from a unit.

3. The method of claim 1, wherein:
    (a) said units are network abstraction layer units of H.264.

4. The method of claim 3 wherein:
    (a) said start code is (in hexadecimal) 0x000001 and said stuff byte (in hexadecimal) is 0x03.

5. The method of claim 1, wherein:
    (a) one bit-handing routine includes a count of consecutive 0s in said unit; and
    (b) applies a stuff-byte discarding method when said count of consecutive 0s indicates a possible stuff byte.

6. A method of encoding a bitstream, comprising:
    (a) receiving a data bitstream to be encoded as a sequence of units, each unit including stuff byte(s) as needed for prevention of emulation of a start code within said unit;
    (b) inserting bits from said data bitstream into one of said units begin encoded with at least one bit-handling routine which inserts stuff byte(s) when needed, said at least one bit-handling routine is selected from a group comprising at least one of a read bit with a shift of bit position, a read bit without a shift of bit position, or a shift bit position.

7. The method of claim 6, wherein:
    (a) said at least one bit-handling routine checks for possible needed stuff bytes using an estimate of the number of consecutive 0s.

8. The method of claim 6, wherein:
    (a) said units are network abstraction layer units of H.264.

9. The method of claim 8 wherein:
    (a) said start code is (in hexadecimal) 0x000001 and said stuff byte (in hexadecimal) is 0x03.

* * * * *